United States Patent [19]

Contini et al.

[11] Patent Number: 4,603,250
[45] Date of Patent: Jul. 29, 1986

[54] IMAGE INTENSIFIER WITH TIME PROGRAMMED VARIABLE GAIN

[75] Inventors: Daniel A. Contini; Terry E. Carsten, both of Orlando; Robert J. Basta, Maitland, all of Fla.

[73] Assignee: The United States of America as represented by the Secretary of the Army, Washington, D.C.

[21] Appl. No.: 644,165

[22] Filed: Aug. 24, 1984

[51] Int. Cl.⁴ .................................................. H01J 31/50
[52] U.S. Cl. ........................................ 250/213 VT; 356/5
[58] Field of Search ............... 250/213 VT, 214 AG; 356/5; 313/103 CM, 105 CM

[56] References Cited

U.S. PATENT DOCUMENTS

| | | | |
|---|---|---|---|
| 3,499,110 | 3/1970 | Heckman, Jr. | 356/5 |
| 3,557,373 | 1/1971 | Hess | 250/207 |
| 3,652,154 | 3/1972 | Gebel | 352/141 |
| 3,666,957 | 5/1972 | Wyess | 250/213 |
| 3,678,279 | 7/1972 | Macknik et al. | 250/203 |
| 3,694,659 | 9/1972 | Ramsay et al. | 250/213 |
| 3,710,126 | 1/1973 | Reif | 250/213 VT |
| 3,714,441 | 1/1973 | Kreda | 250/207 |
| 3,719,823 | 3/1973 | Sheldon | 250/213 VT |
| 3,772,562 | 11/1973 | Goodrich | 250/213 VT |
| 3,816,744 | 6/1974 | Chow | 250/213 |
| 3,864,595 | 2/1975 | Lawrence et al. | 315/12 |
| 3,941,999 | 3/1976 | Moyers, Jr. | 250/213 |
| 3,980,880 | 9/1976 | D'Agostino | 250/213 |
| 3,984,728 | 10/1976 | Orlando et al. | 315/360 |
| 4,044,249 | 8/1977 | Moore, Jr. et al. | 250/213 |
| 4,071,752 | 1/1978 | Manning | 250/213 VT |
| 4,100,406 | 7/1978 | Loty | 250/213 |
| 4,195,222 | 3/1980 | Fouilloy | 250/213 |
| 4,226,529 | 10/1980 | French | 356/5 |
| 4,477,184 | 10/1984 | Endo | 356/5 |
| 4,560,865 | 12/1985 | Bergström | 250/213 VT |

OTHER PUBLICATIONS

*Laser Rangefinders,* TRG Division of Control Data, Jul. 5, 1968, pp. 7–8.
Heppner et al., The Review of Scientific Instruments, vol. 41, No. 10, Oct. 1970, "Blanking Method for Continuous Channel Electron Multipliers".

*Primary Examiner*—David C. Nelms
*Assistant Examiner*—Michael Messinger
*Attorney, Agent, or Firm*—Anthony T. Lane; Jeremiah G. Murray; Edward Goldberg

[57] ABSTRACT

A programmable optical sensor is formed by coupling a proximity focused channel intensifier tube to a silicon target vidicon. The photocathode is gated by a first time programmed voltage and the gain of the microchannel plate is also controlled by a second time programmed voltage. The second voltage is less than 1,000 volts permitting the use of solid state circuitry.

5 Claims, 3 Drawing Figures

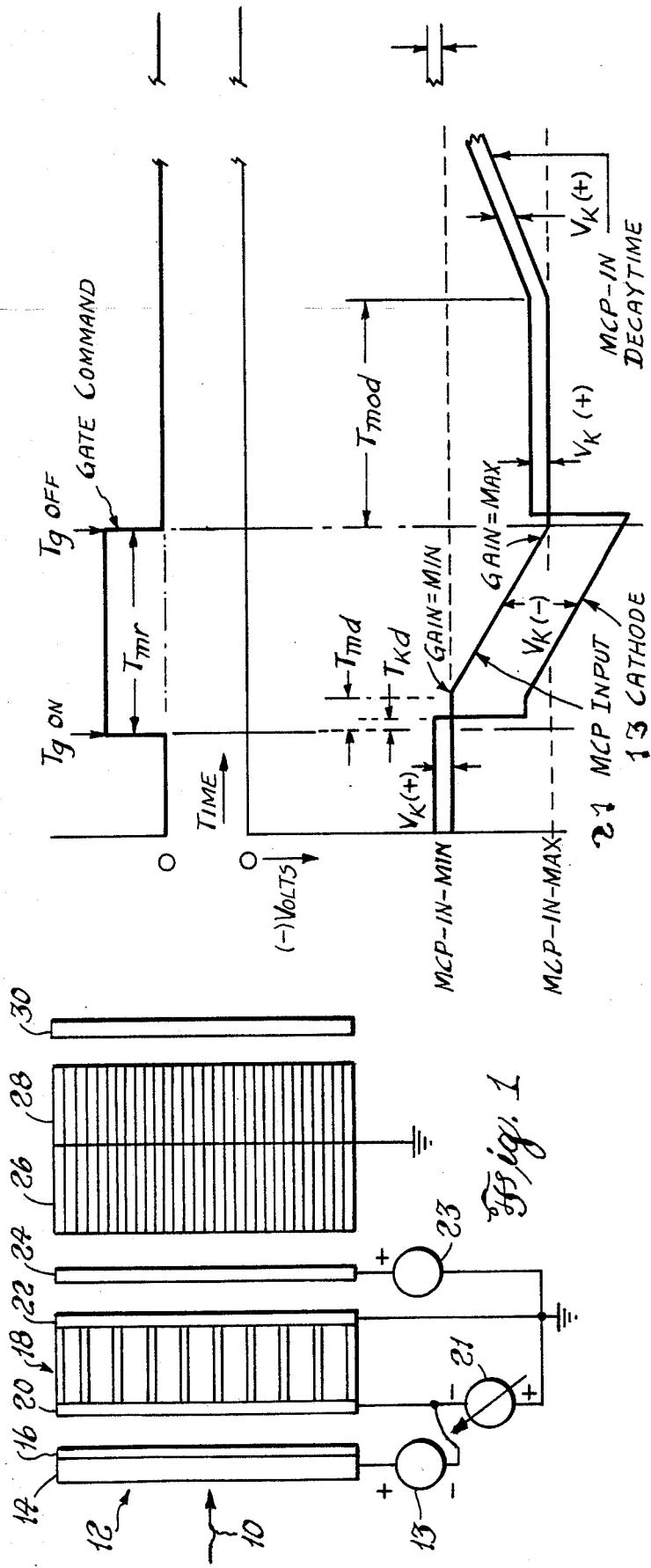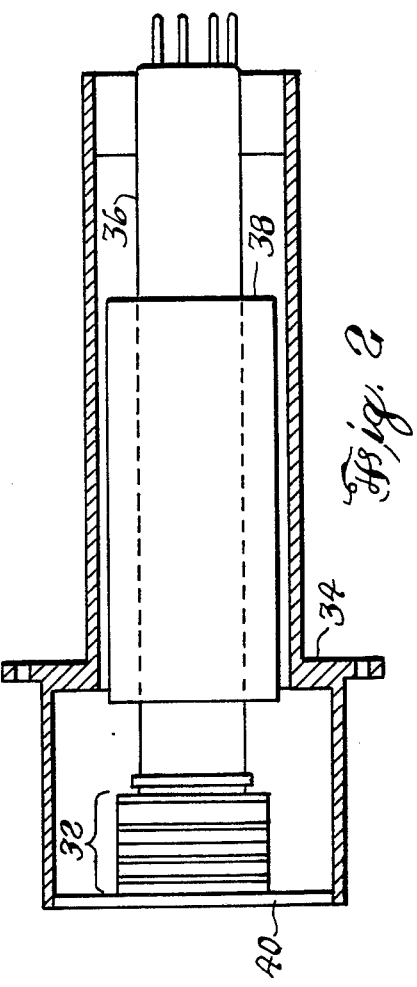

IMAGE INTENSIFIER WITH TIME PROGRAMMED VARIABLE GAIN

The Government has rights in this invention pursuant to Contract No. DAAB07-77-C-3293 awarded by the Department of the Army.

BACKGROUND OF THE INVENTION

1. Field of the Invention

This invention relates generally to optical sensors for use in receiving signals having wide variations in intensity and in particular to such a sensor having a rapid gain variation to accomodate the changes in signal intensity.

Laser radar (LIDAR) and other time/range to target applications have an inherent problem because the intensity of the returning signal has extreme variations. For a distant target the returning signal is of such low intensity that it requires amplification in order to be resolved by the photo sensor. On the other hand, amplification must be reduced for the high intensity signal returning from a closer target. Because such devices are usually used in a scanning application, a rapid change in gain is needed.

2. Description of the Prior Art

One approach to solving the range dependent laser radar dynamic range problem previously used graded intensity target illumination beams to direct more energy toward distant targets and less energy toward near targets. This technique suffers from slant path/platform dependent geometrical restrictions that make it difficult in near ground level applications to provide range independent uniform optical signal returns.

A second approach involved voltage control of the gain of standard gatable Intensifier Silicon-Intensifier Target (ISIT) camera tubes and Silicon-Intensifier Target (SIT) camera tubes. This technique fails in that the control of the gain of devices such as the ISIT and SIT also affects device focus. The control of both focus and gain then becomes much more complex and also must be done at extremely high working voltages (up to 20,000 VDC).

Hess, U.S. Pat. No. 3,557,373, entitled "Method and Circuits for Regulating the Gain of a Photomultiplier for Laser-Telemetry Apparatus", sets the gain of the photomultiplier as a function of the intensity of the prevailing background radiation.

Gebel, U.S. Pat. No. 3,652,154, entitled "Light Control System for Use in Very Low Light Intensities", provides a relatively constant light intensity to the image receiving device in spite of changing scene intensities through the use of a storage light detector which integrates temporally the light intensity from the scene viewed.

Wyess, U.S. Pat. No. 3,666,957, entitled "Brightness Limiter for Image Intensifiers", relates to an image intensifier having a microchannel plate (MCP). The system has an output screen in the proximity of the output of the MCP. The current supplied to the output screen which is proportional to brightness is sensed, and the voltage applied across the MCP is changed to limit the brightness to a desired level.

Macknik et al, U.S. Pat. No. 3,678,279, entitled "Automatic Variable Gain Optical Tracker for Space Vehicles Comprising D-C System for Error Signal Generation", disclose a quadrant target tracker having a separate photomultiplier for each quadrant. The outputs of the photomultipliers are summed and used to provide automatic gain control of the photomultipliers which varies inversely with the brightness of the target.

Ramsay et al, U.S. Pat. No. 3,694,659, entitled "Automatic Control Circuit for Image Intensifier", control the brightness of a multistage image intensifier tube to suppress the normal response to intense flashes of light by, e.g. monitoring direct current changes in the oscillator supply circuit and limiting current in this circuit when it is excessive.

Kreda, U.S. Pat. No. 3,714,441, entitled "Photomultiplier Gain Control Circuit", directs a reference light beam on a photomultiplier to establish a desired output voltage. This voltage is compared with that resulting from incident light and the voltage supplied to the photomultiplier is increased or decreased accordingly.

Chow, U.S. Pat. No. 3,816,744, entitled "Fast Response Automatic Brightness Control Circuit for Second Generation Image Intensifier Tube", discloses a protection circuit for an image intensifier tube which senses screen current at the gate electrode of a junction FET. A low junction capacitance diode is used in the circuit to reduce the time for response to changes in the screen current.

Lawrence et al, U.S. Pat. No. 3,864,595, entitled "Automatic Brightness Control for Gated Micro-Channel Plate Intensifier", use a gating circuit to apply the electron image produced in the photocathode element to the micro-channel plate only when desired. A brightnesss control circuit is used to prevent saturation of the phosphorus screen.

Moyers, Jr., U.S. Pat. No. 3,941,999, entitled "Automatic Focus Pulse Gated System", uses a toroidal, transparent member of changing thickness to vary the focal length of the objective lens of the system. As the toroidal member is rotated, the gating pulse timing is also changed.

D'Agostino, U.S. Pat. No. 3,980,880, entitled "Automatic Exposure Control Circuit for an Image Intensifier Camera", limits the energy provided to an image intensifier tube to that obtained in the discharge of a capacitor.

Orlando et al, U.S. Pat. No. 3,984,728, entitled "Image Intensifier Tube Gating Circuit", disclose a gating circuit which eliminates the voltage between the image intensifier tube anode and cathode when the tube is cut off. This eliminates scintillations which cause distortions on photographic film.

Moore, Jr. et al, U.S. Pat. No. 4,044,249, entitled "Voltage Supply Including Bilateral Attenuator", disclose circuitry for producing a plurality of DC voltages which requires only a single oscillator.

Loty, U.S. Pat. No. 4,100,406, entitled "Photoelectric Shutter Tube with Microduct Wafer Incorporated in a Wave Propagation Line Which is Integrated in said Shutter Tube", is concerned with matching the propagation in a control signal line with that in the shutter tube.

Fouilloy, U.S. Pat. No. 4,195,222, entitled "Power-Supply Device for a Microchannel Tube", discloses a two level microchannel plate voltage control to eliminate hunting in the device.

French, U.S. Pat. No. 4,226,529, entitled "Viewing Systems", describes a range gated laser scene illuminated arrangement utilizing time gating to view different ranges in the scene.

Heppner et al, in an article in *The Review of Scientific Instruments*, Vol. 41, No. 10, October 1970, entitled "Blanking Method for Continuous Channel Electron Multipliers", describe a gating system for a channel electron multiplier.

SUMMARY OF THE INVENTION

A programmable optical sensor is formed by coupling a proximity focused channel intensifier tube to a silicon target vidicon. Separate voltages which have a time programmed gain are used to control the gating of the photocathode and the gain of the microchannel plate. The voltage which controls gain is less than 1000 volts permitting a simple solid state transistor regulator to perform time programming.

BRIEF DESCRIPTION OF THE DRAWINGS

FIG. 1 illustrates schematically the major components of the programmable optical sensor of this invention;

FIG. 2 represents the programmable optical sensor of this invention in packaged form; and FIG. 3 shows the time programmed gain waveforms and typical timing.

DESCRIPTION OF THE PREFERRED EMBODIMENT

The programmable optical sensor of this invention comprises a proximity focused channel intensifier tube (PFCIT) coupled to a silicon target vidicon (STV). Referring to FIG. 1, in which the major components of the programmable optical sensor are schematically shown, photons 10 from a target, strike the face of photocathode 12. Photocathode 12 has a transparent, electically conductive front layer 14, and a back layer 16 of photoemissive material. Photocathode 12 has applied to it a time programmed gating voltage by gating voltage control 13. Gating voltage control 13 is well known in the art. In the embodiment actually built, approximately 50 volts DC reverse bias completely cut off the sensor. Forward voltages from 0 to approximately 170 volts will gradually turn the intensifier section of the sensor "on" with full gain and best focus at full voltage. Once the voltage is above 100 volts little effect on focus is observed. An electron image is produced by the photoemissive material of back layer 16 which corresponds to the radiation image formed by photons 10.

Microchannel plate 18, having a first electrode 20 and a second electrode 22, is positioned adjacent to photocathode 12 to receive the electron image. First electrode 20 is connected to time programmed voltage source 21 of a type commonly known in the prior art which supplies from 0 to 800 volts DC, and second electrode 22 is connected to ground. As is amply described in the prior art, the electron image is intensified in microchannel plate 18 in proportion to the potential difference or gain between first and second electrodes 20 and 22. The voltage across microchannel plate 18 is separately programmed by voltage source 21 from that applied to photocathode 12.

The intensified electron image from microchannel plate 18 is directed onto phosphor screen 24. A fixed bias voltage of from 3,000 to 5,000 volts DC is applied to phosphor screen 24 by source 23. The voltage between microchannel plate 18 and phosphor screen 24 affects conversion efficiency, and, once above a predetermined level, provides sufficient and relatively constant luminous gain until breakdown potentials are reached.

A first fiber optic stage 26 is positioned in contact with phosphor screen 24 to receive the image excited on the screen by the electrons striking it, and transfers this image to a second fiber optic stage 28. Fiber optic stages 26 and 28 are optically bonded together, but electrically isolated from each other with a grounded NESA conducting coat. Fiber optic stage 28 is the faceplate of a silicon target vidicon (STV) device having target 30 to which it is bonded.

Photocathode 12, microchannel plate 18, phosphor screen 24 and first fiber optic stage 26 together form a proximity focused channel plate intensifier tube (PFCIT). The PFCIT just described is produced by a number of companies for night vision applications and is available for specific bands in the infrared spectrum.

The silicon target vidicon (STV) is a portion of the structure of the Intensifier Silicon-Intensifier Target vidicon referred to in the Background of the Invention. In accordance with the invention, the PFCIT and STV are here combined to form the programmable optical sensor.

Referring now to FIG. 2, the programmable optical sensor is illustrated to depict more realistically the relative sizes of its components. Proximity focused channel intensifier tube 32 is positioned in the front of tube housing 34. Silicon intensifier target 36 occupies most of the length of housing 34. Focus, deflection and alignment yoke 38 is positioned about silicon intensifier target 36 in the conventional manner. Housing 34 is metal and has glass or ceramic window 40 at the front which is transparent to the radiation of interest. The remaining volume of housing 34 contains potting material which may be of the room temperature vulcanizing type.

Referring next to FIG. 3, time programmed gain power supply waveforms and typical timing are illustrated. Both the upper graph which represents the gate command timing, and the lower graph which represents both the voltages and timing of the microchannel plate (MCP) and the photocathode (18 and 12 respectively of FIG. 1) are on the same time scale. At time $T_g$ on, the gate command is given and in accordance with the programming, in less than 1 μsec cathode delay time $T_{kd}$, the forward voltage applied by time programmed voltage control 13 to photocathode 12 begins to increase to gate the tube on. Microchannel plate 18 has a somewhat longer (less than 1.5 μsec) delay time $T_{md}$, before its voltage applied by time programmed voltage source 21 begins to increase. At time $T_g$ off, after a gate on time $T_{mr}$ of 20–100 μsec, the command to gate turn off is given. After a short delay the two voltages stop increasing and the cathode voltage decreases enough to turn off. After an off delay $T_{mod}$, of about 1–10 μsec, both voltages decay back to their original levels over about 1 msec. At this time the sensor is ready for a new cycle.

Time programmed gain causes the programmable optical sensor to integrate less scene because it operates at maximum gain only over the end of the gate cycle. The effective gate width is thus shorter than the actual gate width. For the scene limited case, the proximity focused channel intensifier tube can be operated at higher peak gain for the same silicon target vidicon operating conditions as in the SIT/ISIT referred to earlier, and a more sensitive optical receiver results.

Although a particular embodiment of a programmable optical sensor has been illustrated and described, it will be apparent that changes and modifications can be made without departing from the spirit of the invention or the scope of the appended claims.

We claim:

1. A programmable optical sensor comprising:
   a proximity focused channel intensifer tube; and
   a silicon target vidicon optically coupled to said proximity focused channel intensifer tube but electrically isolated therefrom, said proximity focused channel intensifer tube including an image receiving photocathode, and adjacent microchannel plate having first and second electrodes on opposite sides thereof, and a phosphor screen;
   a first source of direct voltage applying a time programmed variable gating voltage to said photocathode;
   a second source of direct voltage applying a time programmed variable voltage across said opposite electrodes of said michrochannel plate and being independent of and programmed separately from said first source;
   a third source of direct voltage applying a fixed voltage to said phosphor screen;
   optical coupling means between said channel intensifer tube and silcicon target vidicon including a first fiber optic stage in said proximity focused channel intensifer tube adjacent said phosphor screen, and a second fiber optic stage in said silicon target vidicon adjacent said first fiber optic stage.

2. The programmable optical sensor in accordance with claim 1 wherein:
   said first time programmed voltage source never exceeds 200 volts forward voltage; and
   said second time programmed voltage source never exceeds 1,000 volts forward voltage.

3. The programmable optical sensor in accordance with claim 1 including a grounded NESA conductive coat between said first and second fiber optic stages providing electrical isolation between said silicon target vidicon and channel intensifier tube.

4. The device of claim 1 wherein said first time programmed voltage source applies a first voltage of from 0 to 100 volts to said photocathode, said second time programmed voltage source applies a second voltage across said electrodes of said microchannel plate of from 0 to 800 volts at a given time after said first voltage, said third voltage source applies a fixed bias voltage of from 3,000 to 5000 volts DC to said phosphor screen, said first and second voltages being terminated after from 20 to 100 microseconds.

5. The device of claim 4 wherein said second electrode of said microchannel plate is connected to ground.

* * * * *